US010839177B2

(12) United States Patent
Finocchiaro et al.

(10) Patent No.: US 10,839,177 B2
(45) Date of Patent: Nov. 17, 2020

(54) RADIOFREQUENCY TAG DEVICE, CORRESPONDING ASSEMBLY AND METHOD

(71) Applicant: STMicroelectronics S.r.l., Agrate Brianza (IT)

(72) Inventors: Alessandro Finocchiaro, Catania (IT); Giovanni Girlando, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/281,873

(22) Filed: Feb. 21, 2019

(65) Prior Publication Data

US 2019/0266367 A1 Aug. 29, 2019

(30) Foreign Application Priority Data

Feb. 28, 2018 (IT) .................. 102018000003127

(51) Int. Cl.
 *G06K 7/10* (2006.01)
 *G06K 19/077* (2006.01)
 *H01Q 1/22* (2006.01)
 *H01Q 21/00* (2006.01)
 *H01Q 7/00* (2006.01)

(52) U.S. Cl.
 CPC ... *G06K 7/10366* (2013.01); *G06K 19/07794* (2013.01); *H01Q 1/2216* (2013.01); *H01Q 1/2225* (2013.01); *H01Q 7/00* (2013.01); *H01Q 21/00* (2013.01)

(58) Field of Classification Search
 CPC ............. G06K 7/10; G06K 7/08; G06K 7/081
 USPC ................... 235/451, 439, 375, 487, 492
 See application file for complete search history.

(56) References Cited

U.S. PATENT DOCUMENTS

| 6,378,774 B1 | 4/2002 | Emori et al. |
| 2005/0052283 A1* | 3/2005 | Collins ............ G06K 19/07767 340/572.7 |
| 2006/0044769 A1 | 3/2006 | Forster et al. |
| 2007/0273515 A1* | 11/2007 | MacKenzie ...... G06K 19/07749 340/572.1 |

(Continued)

FOREIGN PATENT DOCUMENTS

JP 2009295811 A 12/2009

OTHER PUBLICATIONS

IT Search Report and Written Opinion for IT Appl. No. 102018000003127 dated Nov. 7, 2018 (8 pages).

*Primary Examiner* — Edwyn Labaze
(74) *Attorney, Agent, or Firm* — Crowe & Dunlevy

(57) ABSTRACT

An electromagnetic interposer circuit is attachable to an article that is also equipped with an anti-counterfeit and anti-theft/tracking electromagnetic marker. The interposer circuit includes a first interface for exchanging electrical signals with the marker at a first, shorter, communication range and a second interface coupled to the first interface for exchanging electromagnetic signals with a reader at a second, longer, communication range. The first and second interfaces exchange signals with the marker and the reader, respectively, over a radiofrequency bandwidth that includes a first frequency band and a second frequency band. A filter circuit block within the interposer circuit between the first interface and the second interface operates to block the transfer of signals between the first interface and the second interface over the first frequency band.

19 Claims, 2 Drawing Sheets

(56) References Cited

U.S. PATENT DOCUMENTS

| | | | |
|---|---|---|---|
| 2010/0090833 A1 | 4/2010 | Mullis et al. | |
| 2010/0302013 A1* | 12/2010 | Kato | G06K 19/07749 340/10.51 |
| 2013/0207781 A1* | 8/2013 | Pagani | G06K 7/10178 340/10.1 |
| 2016/0342821 A1 | 11/2016 | Nyalamadugu et al. | |
| 2017/0288461 A1* | 10/2017 | Konanur | H04B 5/0037 |
| 2018/0096777 A1* | 4/2018 | Akcasu | H01F 27/2804 |

* cited by examiner

RADIOFREQUENCY TAG DEVICE, CORRESPONDING ASSEMBLY AND METHOD

PRIORITY CLAIM

This application claims the priority benefit of Italian Application for Patent No. 102018000003127, filed on Feb. 28, 2018, the content of which is hereby incorporated by reference in its entirety to the maximum extent allowable by law.

TECHNICAL FIELD

The description relates to tag devices.

One or more embodiments may be used for anti-counterfeit/anti-theft purposes as well as in tracking items.

One or more embodiments may be applied, e.g., in tagging various consumer commodities such as luxury goods, food, medicines, confidential or sensitive documents.

One or more embodiments may facilitate electronic article surveillance (EAS), e.g., in anti-theft system applications and traceability of items in manufacturing processes and during shipment and delivery of goods.

BACKGROUND

Counterfeiting of goods represents a major source of concern for companies, also in view of market globalization. Counterfeit products are fake copies or unauthorized replicas of authentic products (such as clothing, handbags, shoes, pharmaceuticals, aviation and automobile parts, watches, electronics, software, works of art, toys, and movies).

Simultaneously, the problem of stolen articles is more and more serious, e.g., in department stores. Thus, various anti-theft systems or methods are used to prevent or deter unauthorized appropriation of items considered valuable. Various solutions have been devised in order to facilitate protection of goods for anti-counterfeit (i.e., showing counterfeiting products), anti-theft and also for tracking purposes.

While somehow related to one another, these possible applications may exhibit somehow conflicting features.

For instance, a miniaturized solution for anti-counterfeit purposes (e.g., in order to make a certain article such as a luxury good recognizable as an "authentic," non-fake product) may not be suitable for anti-theft systems (for instance, systems against shoplifting). This may be due, e.g., to a reduced reading range, as conventional for anti-counterfeit applications, which is hardly compatible with detection at store gates. Also, a miniaturized solution may prove inadequate for reliably tracking a certain item in a manufacturing process and/or a supply/delivery chain.

Certain commercial RFID solutions use antennas larger than 1 cm² of area, which in turn is hardly compatible with anti-counterfeit applications. Consequently, in addition to possibly requiring dedicated arrangements, certain solutions devised in order to facilitate monitoring of items in a production chain may not be suited for anti-counterfeit purposes (e.g. due to their sizes).

To sum up, while various existing solutions may be adapted for specific applications (e.g., anti-counterfeit, anti-theft or tracking of items), solutions adapted for use in multiple applications are desirable.

There is accordingly a need in the art to provide such an improved solution.

SUMMARY

According to one or more embodiments, an assembly comprises a device in combination with an electromagnetic marker, for instance a miniaturized component comprising an integrated circuit and an associated "interface" facilitating short-range operation as currently adopted for anti-counterfeit purposes.

One or more embodiments may relate to a corresponding method.

The claims are an integral part of the technical teaching provided herein in respect of embodiments.

One or more embodiments may provide a tag with a miniaturized antenna (coupler) which may be "embedded" or "buried" in a certain item.

In one or more embodiments, a detachable magnifier interposer may comprise a coupler (e.g. inductive, capacitive, electromagnetic or galvanic), a stop-band filter (e.g., a notch filter) and a far-field or near-field antenna.

In one or more embodiments, a detachable magnifier interposer may be coupled with an integrated circuit (IC) in a tag with the capability of communicating with a reader through a far field or near field antenna.

As currently defined in electromagnetism:
a far field antenna is an antenna able to communicate efficiently at a distance greater than $\lambda/2\pi$, where $\lambda$ is the wavelength of the electromagnetic signal,
a near field antenna is an antenna able to communicate efficiently (only) at a distance less than or equal to $\lambda/2\pi$.

In one or more embodiments (only) anti-theft or tracking frequencies can be transmitted, while an anti-counterfeit frequency band can be rejected e.g. thanks to the presence of a band-stop filter. As well known to those skilled in the art of signal processing, a band-stop filter (or band-rejection filter) is a filter that passes most frequencies unaltered, but attenuates those in a specific range to very low levels.

One or more embodiments may provide a magnifier interposer adapted to be positioned near a miniaturized tag to enable anti-theft or tracking functions, with the possibility of being disabled in anti-counterfeit operation.

In one or more embodiments, once anti-theft or tracking operation is no longer desired, the detachable interposer may be removed and re-used, e.g. for another item.

In an embodiments, a device comprises: an electromagnetic interposer circuit configured to be applied onto an article equipped with an electromagnetic marker, wherein the electromagnetic interposer circuit includes: a first interface configured to exchange electrical signals with said marker at a first communication range, and a second interface coupled to the first interface and configured to exchange electromagnetic signals with a (remote) reader at a second communication range, the second communication range being longer than the first communication range.

One or more embodiments may comprise a first interface configured to be coupled electromagnetically, capacitively, inductively or galvanically with said electromagnetic marker.

In one or more embodiments the second interface may comprise an antenna configured for exchanging electromagnetic signals with a homologous antenna in the reader.

Such antenna may be selected out of a variety of antennas, including dipole antennas, folded dipole antennas, and so on. In one or more embodiments the second interface may comprise an antenna such as a loop antenna and an array antenna.

In an embodiment: the first interface and the second interface may be configured to exchange signals with said marker and with said reader, respectively, over a radiofrequency bandwidth including a first frequency band and a second frequency band, and the interposer circuit may comprise a filter circuit block intermediate the first interface and the second interface, the filter circuit block configured to counter signal transfer between the second interface and the first interface over said first frequency band.

In one or more embodiments, the filter circuit block may comprise a notch filter, optionally of the LC type.

In one or more embodiments, the first interface and the second interface may be configured to exchange signals in frequency bands selected from HF, VHF, UHF or SHF bands.

In one or more embodiments, the interposer circuit may be selectively removable from the article, e.g., for possible use with another article.

One or more embodiments may relate to an assembly comprising an electromagnetic marker device in combination with a device according to one or more embodiments.

In that way, an article such as an item to be protected against counterfeiting, theft and/or to be tracked can be equipped in a same act with both an electromagnetic marker and a device according to one or more embodiments.

As discussed previously, this latter device may be possibly removed (once anti-theft or tracking operation is no longer desired) and the electromagnetic marker left in place to continue operating as an anti-counterfeit feature.

In one or more embodiments, the electromagnetic marker device may comprise a processing circuit configured to perform a frequency check on request signals reaching the electromagnetic marker device and selectively refrain from reciprocating request signals as a function of the result of said frequency check.

In an embodiment, a method comprises: equipping an article with an electromagnetic marker; applying onto the article a device according to one or more embodiments with the first interface coupled with the electromagnetic marker for exchange of electrical signals therewith; and exchanging electrical signals between a remote reader and the marker via the interposer circuit of the device.

One or more embodiments may comprise: exchanging first electromagnetic signals between the remote reader and the marker via the interposer circuit of the device; removing the device from the article; and exchanging second electrical signals with the marker with the device removed from the article.

BRIEF DESCRIPTION OF THE DRAWINGS

One or more embodiments will now be described, by way of example only, with reference to the annexed figures, wherein.

DETAILED DESCRIPTION

Figure 1:
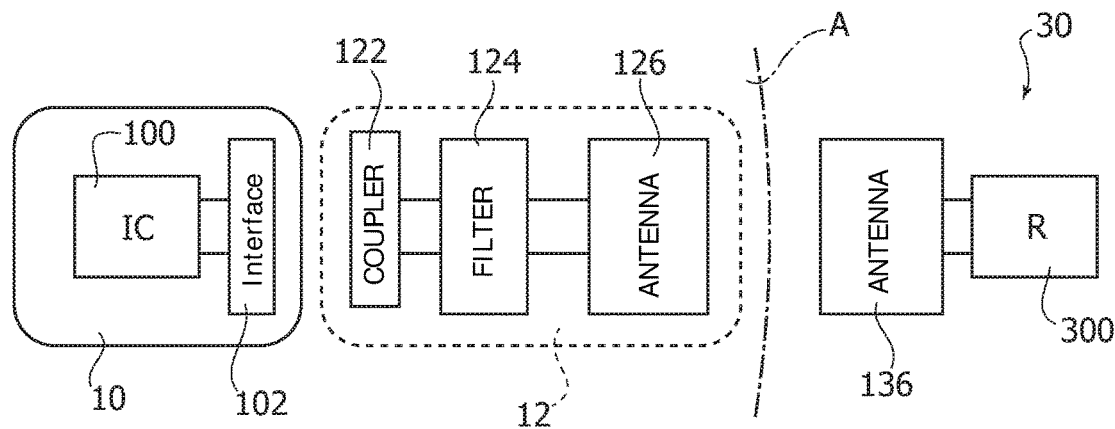
FIG. 1 is generally exemplary of a concept underlying one or more embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

So-called "globalization" has paved the way to a global, worldwide market with production phases and lines distributed over the whole world.

In addition to various positive effects, this phenomenon has led to an increased exposure to counterfeiting of products, for instance in respect of luxury goods.

Counterfeiting, however, is a much wider phenomenon that negatively affects as well other products such as foods, drugs, and various other products with a possible risk of danger for the consumer.

For that reason, various technologies have been developed over the years for countering counterfeiting activities. Various engraving, photo reproduction, laser technologies (e.g., so-called watermarking) have been proposed and adopted for anti-counterfeit purposes.

Various solutions (e.g., solutions involving RFID—an acronym for RadioFrequency IDentification or NFC—an acronym for Near Field Communication) have been developed in the area of microelectronics with the purpose of facilitating achieving safety, security and reliability.

These solutions may rely on the capability of tracking products. That capability may be helpful in preventing theft (e.g. via shoplifting) as well as for tracking a certain item being manufactured or distributed (e.g., shipped, delivered, and so on).

Cryptography algorithms as well as miniaturized solutions, e.g. silicon chips having sizes lower that 1 mm$^2$ (comprising micro-antennas and capable of harvesting sufficient energy to permit operation of an internal integrated circuit) play an increasing role in that scenario.

The energy which may be harvested by means of an antenna is a function of its area, so that the "reading" distance available for miniaturized solutions may be correspondingly reduced (for instance, a few millimeters).

These solutions may be compatible with certain aesthetic requirements: due to the small (miniaturized) size they can be hidden within a certain item. This may be a desirable feature if one has to do with articles or products of relatively small size such as eyeglasses, jewelry, watches, etc.

Another advantage of such small/miniaturized solutions lies in the possibility of embedding/burying the "tag" in the article thus making it difficult to remove it without breaking or damaging the good being protected.

Miniaturized solutions may be satisfactory also in terms of security: reading at short distance is in fact intrinsically protected from undesired "eavesdropping" by means of readers located at a certain distance.

Capacitive and inductive antennas, far field antennas, contacts, inductive, capacitive, electromagnetic and galvanic coupling arrangements are exemplary of solutions which may be adopted in such a context.

As noted, those solutions which were developed primarily in view of anti-counterfeit functions do not lend themselves easily for use in anti-theft and tracking applications.

Relatively long-range reading capabilities (possibly at several meters) as desirable for these applications are hardly compatible with miniaturized solution.

Also, reading at a certain distance may give rise to security issues insofar as data read from a certain distance are exposed to the risk of being "sniffed," that is undesirably read with malicious intent.

One or more embodiments may facilitate providing a miniaturized solution capable of providing anti-theft and tracking features along with anti-counterfeit features, thereby overcoming the conflicting aspects discussed in the introductory portion of the description.

One or more embodiments as exemplified in FIG. 1 may comprise an electromagnetic marker device 10, e.g., a miniaturized component 10 comprising an integrated circuit (IC) 100 and an associated "interface" 102 facilitating short-range operation as currently adopted for anti-counterfeit purposes.

In one or more embodiments, the component 10 can comprise circuits—of a type known per se—to facilitate exchange of data (e.g. a code stored in a memory in the integrated circuit 100) which can identify an article A (e.g., a luxury good, just to make a non-limiting example) onto which the component 10 is applied.

For instance, the component 10 can be incorporated in article in such a way that removal of the component 10 may be detected, for instance due to the article becoming damaged or unsuited for its use, e.g., by being possibly broken.

The data exchanged with the circuit 100 via the interface 102 may be possibly encrypted.

As noted, the component 10 may be realized with any technology known for that purpose.

It will be otherwise appreciated that one or more embodiments may be largely "transparent" with respect to the specific technological choices made for the component 10.

One or more embodiments may rely on the possibility of coupling with the component 10 a "tag" 12. This may be coupled with the article A in such a way to be in the vicinity of the component 10, e.g. as a result of the tag being applied onto the article A.

In one or more embodiments, the tag 12 may be configured (e.g. provided with adhesive means) in such a way to be applicable onto the article A, with the capability of being possibly removed therefrom—possibly by using specific means available (only) to an authorized operator—with the capability of being re-used, e.g., by being applied onto another article or item.

In one or more embodiments the tag (possibly in the form of a label) 12 may comprise a so-called interposer.

The designation "interposer" applies to an electrical interface circuit capable of facilitating routing of (electrical) signals between different components. For instance, interposers are conventionally used for spreading a connection from a certain component to a wider pitch or to re-route a connection to different connections.

Interposers are also conventionally used as adapters, e.g. in connection with drivers and/or to provide path redundancy between various electrical circuits.

In one or more embodiments, the interposer 12 may be intended to act as a sort of "magnifier lens" by extending the electromagnetic wave communication capability of the component 10 to a greater distance (longer range) than the one provided by the technology used in the (e.g., miniaturized) component 10.

In applications as exemplified herein, short range may be a reading range up to some centimeters, while long range may be a reading range of a few meters.

In that way (that is, due to the presence of the interposer 12) the functionality of the component 10 can be extended from a conventional anti-counterfeit function to anti-theft/tracking functions.

In one or more embodiments, the interposer 12 can be configured to perform a selective frequency management action so that, e.g.:

communication between the component 10 and the interposer 12 may take place in a first "anti-counterfeit" frequency band;

communication between the interposer 12 and the outside world may then place over a second "anti-theft" or "tracking" radiofrequency band.

In that way:

the anti-counterfeit function can be performed (at short range) by resorting to the first frequency band, and the anti-theft or tracking functions can be performed (at long range) by resorting to the second frequency band.

It will be otherwise appreciated that the same concept can be extended to a higher number of different frequency bands.

Also, in one or more embodiments, operation in the two (or possibly more) frequency bands may be activated selectively, e.g., via filtering in such a way that anti-counterfeit frequencies can be, so-to-say, "inhibited" in respect of anti-theft or tracking functions.

In one or more embodiments, once an anti-theft/tracking function (e.g., to counter shoplifting of the article A) is no longer desired, the interposer tag 12 can be removed from the article A, and possibly re-used in connection with another article.

In one or more embodiments, the interposer 12 may thus provide an (additional) hardware protection in addition to software protection (as provided, e.g., via cryptographic procedures) insofar as undesired "sniffing" of anti-counterfeit data/information at long range from the article A may be avoided.

In one or more embodiments, the interposer 12 may comprise a coupler 122 configured to permit communication with the interface 102 in the component 10.

For instance, the coupler 122 may comprise an inductive, capacitive, electromagnetic and/or galvanic coupler (e.g. an antenna or possibly a set of contacts) thus permitting communication between the component 10 and the interposer 12.

In one or more embodiments, the interposer 12 may comprise a filter 124 to render operation of the interposer 12 frequency-selective as better discussed in the following.

In one or more embodiments, the interposer 12 may comprise an antenna 126 (e.g. of the far-field or near-field type) facilitating communication with the "outside world", e.g., by facilitating communication with a receiver 300 in a reader device 30 e.g. via an antenna 136 compatible (this may be an antenna essentially of the same type of the antenna 126).

In one more embodiments, the interposer 12 can be applied onto the article A in such a way to facilitate adequate energy transfer with respect to the component 10 (via the interfaces 102, 122), e.g., to facilitate the component 10 in harvesting energy supporting its operation.

This may involve, e.g., positioning the interfaces 102, 122 (very) close to each other and/or aligning them with each other.

In one or more embodiments, the filter 124 (if present) may be configured in such a way to "separate" the frequency band used for anti-counterfeit purposes in such a way that, e.g. the circuit 10 may not be exposed e.g. to authentication requests.

Figure 2:
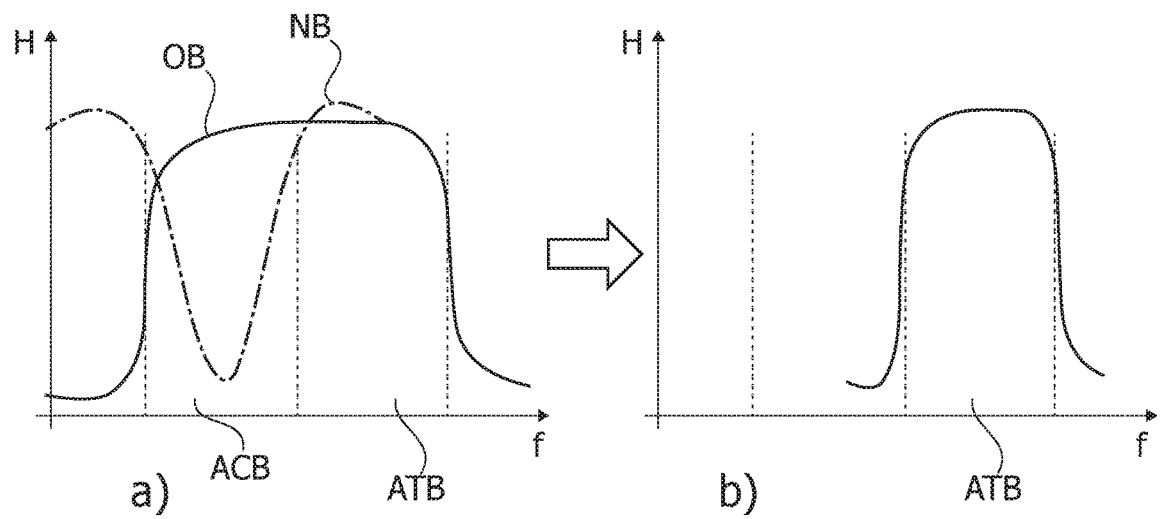
FIG. 2 is a diagram which is exemplary of possible operation of embodiments over various frequency bands.

The diagrams of FIG. 2 are schematically exemplary of the possibility, for one or more embodiments, to operate in connection with two different (e.g. UHF) bands, namely:
a first frequency band, ACB, used for anti-counterfeit purposes, and
a second band, ATB, used for anti-theft/tracking purposes.

In one or more embodiments the interposer 12 may be originally configured to operate over a (e.g., UHF) frequency band (range) OB notionally covering both bands ACB and ATB.

The transfer function of the filter 124 may be configured as exemplified by the curve NB in the left-hand portion a) of FIG. 2 in such a way that only the band ATB is actually available as shown in the right-hand portion b) of FIG. 2 and used for communication between the interposer 12 and the "outside world" (that is the reader 30).

In one or more embodiments, the filter 124 may thus be configured to "inhibit" the anti-counterfeit band ACB by confining its use to communication between the component 10 and the interposer 12.

In one or more embodiments as exemplified in various figures attached herein, the filter 124 can be implemented as a notch filter e.g. a filter comprising the series connection of an inductor L and a capacitor C, having resonating frequency $f=1/2\pi\sqrt{LC}$ arranged in parallel with the coupling interface 122 towards the component 10 (e.g., with this resonance frequency centered on the ACB band).

For instance, in one or more embodiments, the two bands ACB, ATB can be selected as two neighboring UHF bands, so that a single interface can be provided capable of transmitting and receiving over both bands.

In one or more embodiments, the two bands ACB, ATB can be selected within a single standard frequency band (for instance the ISM bands at 13.56 MHz, 433 MHz, 868 MHz, 915 MHz, 2.45 GHz or 5.8 GHz) with a division into two sub-bands/channels having a same width or different widths applied in order to perform the two functions.

In one or more embodiments, the interface (e.g., 102) of the component 10 (integrated circuit 100) may be configured in such a way to be able to operate over the (e.g. ISM) bandwidth with the capability of receiving signals in both bands (ACB and ATB).

However, with the tag/interposer 12 coupled to the article A (and a component 10 provided thereon) the ACB band is inhibited (e.g., confined to possible communication between the component 10 and the interposer 12) with the bandwidth usable for communication with the outer world (e.g., the reader 30) restricted to the ATB band only: for instance, in these conditions, the component 10 may receive signals from the reader 30 only within the band ATB.

For instance, one or more embodiments may adopt the ISM band at 915 MHz (between 902 MHz and 928 MHz) by using the first 13 MHz sub-band (between 902 MHz and 915 MHz) for anti-counterfeit purposes (ACB band) and the second 13 MHz sub-band (between 915 MHz and 928 MHz) for anti-theft/tracking purposes (ATB band).

Alternatively, one or more embodiments may use the 868 MHz band (between 865 MHz and 868 MHz) by using 1.5 MHz (between 865 MHz and 866.5 MHz) for anti-counterfeit purposes and the remaining 1.5 MHz (between 866.5 MHz and 868 MHz) for anti-theft/tracking purposes.

Of course, the quantitative values referred to in the foregoing amount to merely exemplary, non-limiting examples of the possibility for the first interface and the second interface as exemplified herein to exchange signals in frequency bands selected from, e.g., HF, VHF, UHF or SHF bands.

Also, it will be appreciated that using for anti-counterfeit purposes a frequency band (e.g. ACB) in a lower range than the frequency band (e.g. ATB) used for anti-theft/tracking purposes is an optional, non-mandatory feature.

Concerning communication protocols, one or more embodiments may adopt standard protocols of the request/response (client/server) type, e.g., with the integrated circuit 100 possibly capable of performing a frequency check.

For instance, in one or more embodiments, a reader such as 30 may prompt communication for anti-counterfeit or anti-theft/tracking purposes in the respective frequency bands.

The IC 100 in the component 10 may be simply excluded from receiving a request (e.g., an authentication request sent from a distant location) for anti-counterfeit purposes since that (possibly non-authorized) request is carried by a signal with a frequency (e.g., ACB) which is filtered out by the (e.g. notch) filter 124. The IC 100 in the component 10 can conversely receive the request for anti-theft/tracking purposes and react thereon (in any known manner) insofar as such a request is carried by a signal with a frequency (e.g., ATB) which passes through the filter 124, with this latter frequency also adapted to convey feedback from the IC 100 to the reader 30.

In various circumstances, the IC 100 in the component 10 may be capable of receiving (also) the request for anti-counterfeit purposes, e.g.:
because, in one or more simplified embodiments, the interposer 12 does not comprise a filter 124; or
because the interposer 12 has been removed, since the anti-theft/tracking function is no longer required, and even without the "magnifying lens" action of the interposer 12, the request for anti-counterfeit is an (expectedly authorized) request sent from a reader 30 placed in the vicinity of the article A (with the risk of "sniffing" correspondingly reduced).

In one or more embodiments, the IC chip 100 may be configured to perform a frequency check on request signals reaching the electromagnetic marker device 10 and selectively refrain from reciprocating request signals as a function of the result of said frequency check.

For instance, in one or more embodiments, the IC chip 100 may receive the anti-counterfeit request and process it, e.g., by checking whether the request is consistent with the frequency band used with the possibility of responding (in a manner known per se) to the request from the reader 30 (only) if the check yields a positive outcome.

In one more embodiments the chip 100 may thus be configured to discard (and thus refrain from reciprocating) requests conveyed over frequency bands different from the frequency bands used in the system as a result of the frequency check performed.

FIGS. 3 to 6 are exemplary of various possible implementations of the underlying principles discussed in the foregoing. Throughout the embodiments exemplified in these figures, the filter 124 is shown to be present and exemplified as a notch filter. As noted, certain simplified embodiments may not comprise the filter 124 and/or other implementation of the filter 124 are possible (based on principles known to those of skill in the art).

Also, details of embodiments exemplified (individually or in combination) in connection with any one of the figures attached can be applied (individually or in combination) to embodiments exemplified in connection with any other of the figures attached. Stated otherwise, details of embodiments exemplified in the figures attached are not intended to be necessarily limited to use within the embodiment wherein their possible use is exemplified.

Figure 3:
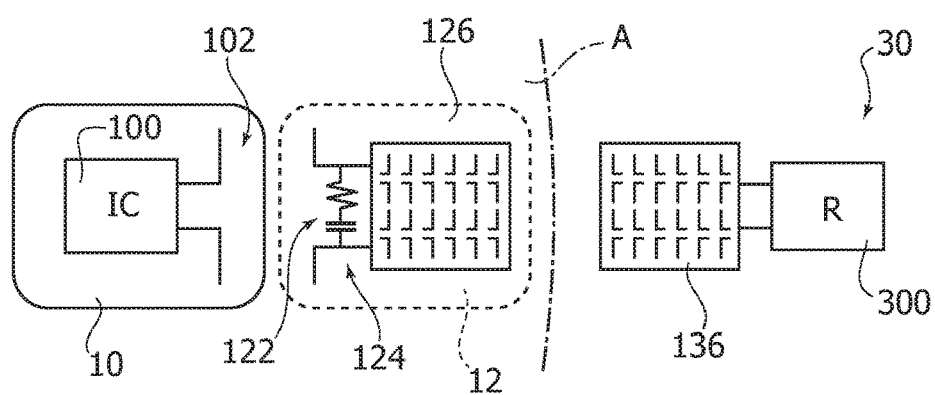
FIGS. 3 to 6 are exemplary of various possible implementations of embodiments.

For instance, in embodiments as exemplified in FIG. 3, coupling between the interfaces 102, 122 and the antennas 126, 136 may be of an electro-magnetic type, e.g., via antennas, with the antennas 126, 136 comprising, e.g., an array of far-field antennas.

Figure 4:
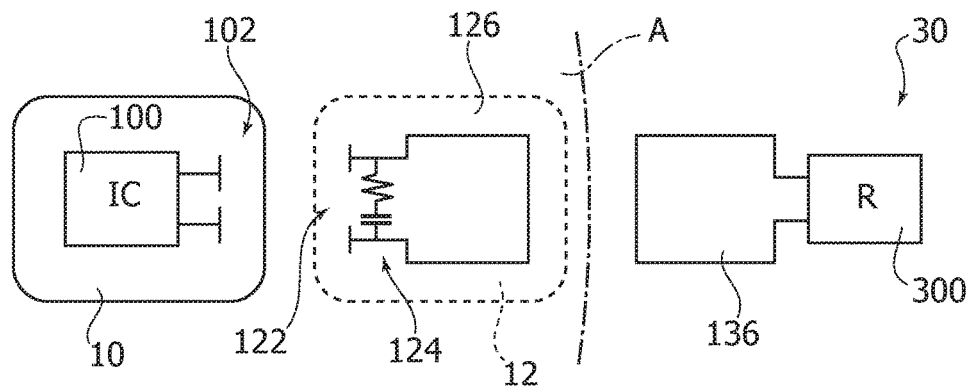

In embodiments as exemplified in FIG. 4, the coupling between the interfaces 102, 122 is of a capacitive type with the antennas 126, 136 of a (near-field) loop type.

Figure 5:
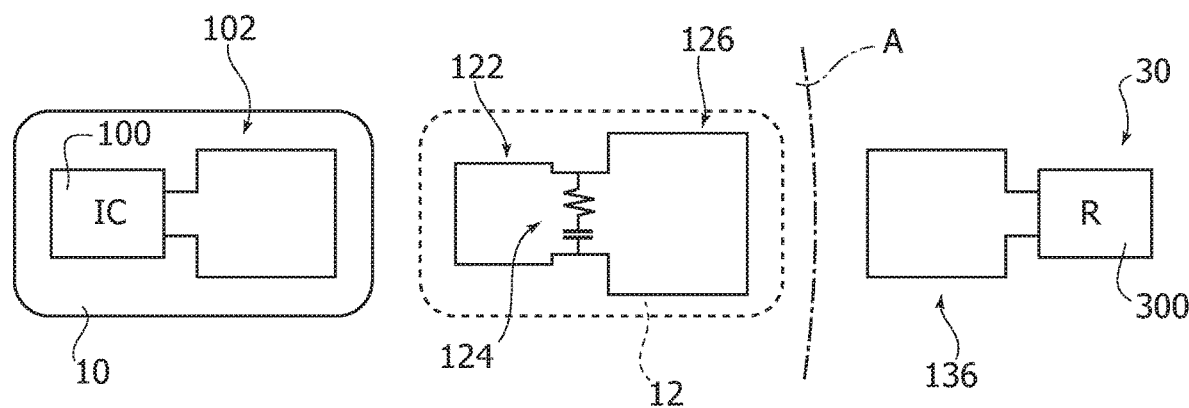

In embodiments as exemplified in FIG. 5 coupling between the interfaces 102, 122 may be of an inductive type (e.g. loop antennas) with the antennas 126, 136 also being of the (near-field) loop type.

Figure 6:
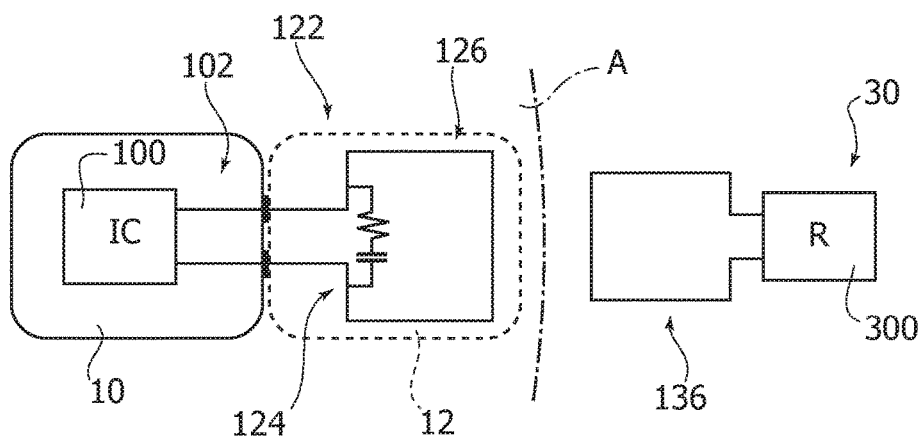

In embodiments as exemplified in FIG. 6 coupling between the interfaces 102, 122 may be of a galvanic type (e.g. sliding contacts or the like, which as such may also transmit RF signals) with coupling between the antennas 126, 136 being again of the (near-field) loop type.

In one or more embodiments a device (e.g., 12), may comprise:
an electromagnetic interposer circuit (e.g., 122, 124, 126) applicable (e.g. adhesively and/or removably) onto an article (e.g., A, such as a luxury good) equipped with an electromagnetic marker (e.g., 10, such as a RFID marker for anti-counterfeit and/or anti-theft/tracking purposes), the circuit comprising:
a first interface (e.g., 122) configured to exchange electrical signals with said marker at a first (short, e.g. near-field) communication range, and
a second interface (e.g., 126) coupled (e.g., at 124) to the first interface and configured to exchange electromagnetic signals with a (remote) reader (e.g., 30) at a second (long) communication range, the second communication range longer than the first communication range.

One or more embodiments may comprise a first interface configured to be coupled electromagnetically (see, e.g., FIG. 3), capacitively (see, e.g., FIG. 4), inductively (see, e.g., FIG. 5) or galvanically (see, e.g., FIG. 6) with said electromagnetic marker (10).

In one or more embodiments the second interface may comprise an antenna (e.g., 126) configured for exchanging electromagnetic signals with a homologous antenna (e.g., 136) in the reader.

Such antenna may be selected out of a variety of antennas, including dipole antennas, folded dipole antennas, and so on. In one or more embodiments the second interface may comprise an antenna out of a loop antenna (see, e.g., FIGS. 4 to 6) and an array antenna (see, e.g., FIG. 3).

In one or more embodiments:
the first interface and the second interface may be configured to exchange signals with said marker and with said reader, respectively, over a radiofrequency bandwidth (e.g., OB) including a first frequency band (e.g., ACB) and a second frequency band (e.g., ATB),
the interposer circuit may comprise a filter circuit block (e.g., 124) intermediate the first interface and the second interface, the filter circuit block configured to counter signal transfer between the second interface and the first interface over said first frequency band.

In one or more embodiments the filter circuit block may comprise a notch filter, optionally of the LC type.

In one or more embodiments, the first interface and the second interface may be configured to exchange signals in frequency bands selected from HF, VHF, UHF or SHF bands.

In one or more embodiments, the interposer circuit may be selectively removable from the article, e.g., for possible use with another article.

One or more embodiments may relate to an assembly comprising an electromagnetic marker device in combination with a device according to one or more embodiments.

In that way, an article (e.g. an item to be protected against counterfeiting, theft and/or to be tracked) can be equipped in a same act with both an electromagnetic (e.g. RFID) marker and a device according to one or more embodiments.

As discussed previously, this latter device may be possibly removed (once anti-theft or tracking operation is no longer desired) and the electromagnetic marker left in place to continue operating as an anti-counterfeit feature.

In one or more embodiments, the electromagnetic marker device may comprise a processing circuit (e.g., an IC 100) configured to perform a frequency check on request signals reaching the electromagnetic marker device and selectively refrain from reciprocating request signals as a function of the result of said frequency check.

A method according to one or more embodiments may comprise:
equipping an article (e.g. an item to be protected against counterfeiting, theft and/or to be tracked) with an electromagnetic (e.g. RFID) marker,
applying onto the article a device according to one or more embodiments with the first interface coupled (e.g. arranged close to and/or aligned) with the electromagnetic marker for exchange of electrical signals therewith, and
exchanging (e.g. anti-theft/tracking) electrical signals between a remote reader and the marker via the interposer circuit (122, 124, 126) of the device.

One or more embodiments may comprise:
exchanging first (e.g. anti-theft/tracking) electromagnetic signals between the remote reader and the marker via the interposer circuit of the device,
removing the device from the article, and
exchanging second (e.g. anti-counterfeit) electrical signals with the marker with the device removed from the article.

Without prejudice to the underlying principles, the details and embodiments may vary, even significantly, without departing from the extent of protection.

The extent of protection shall be determined by the annexed claims.

The invention claimed is:
1. A device, comprising:
an electromagnetic interposer circuit configured to be attached to an article equipped with an electromagnetic marker that is operational to communicate over a first radio frequency band and communicate over a second radio frequency band, wherein the electromagnetic interposer circuit comprises:
a first interface configured to exchange electrical signals with said electromagnetic marker at a first communication range, and a second interface coupled to the first interface and configured to exchange electromagnetic signals with a reader at a second communication range, and a filter circuit coupled between the first interface and the second interface, said filter circuit configured to permit signal passage between the first interface and the second interface for permitting communication with the electromagnetic marker using said first radio frequency band but block signal passage between the first interface and the second interface for blocking communication with the electromagnetic marker using said second radio frequency band, wherein the second communication range is longer than the first communication range.

2. The device of claim 1, comprising a first interface configured to be one of electromagnetically coupled, capacitively coupled, inductively coupled or galvanically coupled with said electromagnetic marker.

3. The device of claim 1, wherein the second interface comprises an antenna configured for exchanging electromagnetic signals with a homologous antenna in the reader.

4. The device of claim 1, wherein the second interface comprises an antenna selected from the group consisting of a loop antenna and an array antenna.

5. The device of claim 1, wherein the filter circuit comprises a notch filter.

6. The device of claim 1, wherein the filter circuit is of an LC type.

7. The device of claim 1, wherein the first and second radio frequency bands are within a band selected from the group consisting of a HF band, a VHF band, an UHF band or a SHF band.

8. The device of claim 1, wherein the electromagnetic interposer circuit is selectively removable from the article.

9. A system, comprising:

an electromagnetic marker configured to be equipped within an article and operational to communicate over a first radio frequency band at a first communication range and communicate over a second radio frequency band at said first communication range; and a device comprising:

an electromagnetic interposer circuit configured to be attached to the article, wherein the electromagnetic interposer circuit comprises:

a first interface configured to exchange electrical signals with said electromagnetic marker at the first communication range, and a second interface coupled to the first interface and configured to exchange electromagnetic signals with a reader at a second communication range, and a filter circuit between the first interface and second interface configured to permit signal passage between the first interface and the second interface for permitting communication with the electromagnetic marker using said first radio frequency band but block signal passage between the first interface and the second interface for blocking communication with the electromagnetic marker using said second radio frequency band, wherein the second communication range is longer than the first communication range.

10. The system of claim 9, wherein the electromagnetic marker comprises a processing circuit configured to perform a frequency check on request signals reaching the electromagnetic marker over said second frequency band and selectively refrain from reciprocating request signals over said second frequency band as a function of the result of said frequency check.

11. The system of claim 9, comprising a first interface configured to be one of electromagnetically coupled, capacitively coupled, inductively coupled or galvanically coupled with said electromagnetic marker.

12. The system of claim 9, wherein the second interface comprises an antenna configured for exchanging electromagnetic signals with a homologous antenna in the reader.

13. The system of claim 9, wherein the second interface comprises an antenna selected from the group consisting of a loop antenna and an array antenna.

14. The system of claim 9, wherein the filter circuit comprises a notch filter at said second frequency band.

15. The system of claim 9, wherein the filter circuit is of an LC type.

16. The system of claim 9, wherein the first and the second radio frequency bands are within a band selected from the group consisting of a HF band, a VHF band, an UHF band or a SHF band.

17. The system of claim 9, wherein the electromagnetic interposer circuit is selectively removable from the article.

18. The system of claim 9, wherein the electromagnetic marker communicates in response to a first type of request over the first radio frequency band and communicates in response to a second type of request over the second radio frequency band.

19. The system of claim 9, wherein the electromagnetic marker is a tag for a product and the first type of request concerns anti-counterfeiting and the second type of request concerns anti-theft, the filter circuit permitting the second type of request from the reader to pass between the first interface and the second interface to the electromagnetic marker and the filter circuit blocking the first type of request from the reader from passing between the first interface and the second interface to the electromagnetic marker.

* * * * *